US009369432B2

(12) United States Patent
Qin et al.

(10) Patent No.: US 9,369,432 B2
(45) Date of Patent: Jun. 14, 2016

(54) SYSTEM AND METHOD FOR SECURE NETWORK COMMUNICATIONS

(71) Applicant: Calix, Inc., Petaluma, CA (US)

(72) Inventors: Zhijian Qin, Santa Rosa, CA (US); Srinivas Nukala, Rosemead, CA (US); Weimin Zhou, Petaluma, CA (US)

(73) Assignee: Calix, Inc., Petaluma, CA (US)

( * ) Notice: Subject to any disclaimer, the term of this patent is extended or adjusted under 35 U.S.C. 154(b) by 190 days.

(21) Appl. No.: 14/253,437

(22) Filed: Apr. 15, 2014

(65) Prior Publication Data
US 2015/0295890 A1  Oct. 15, 2015

(51) Int. Cl.
*H04L 29/06* (2006.01)

(52) U.S. Cl.
CPC .............. *H04L 63/02* (2013.01); *H04L 63/029* (2013.01); *H04L 65/1066* (2013.01)

(58) Field of Classification Search
CPC ...................................................... H04L 63/029
USPC ........................................................... 726/11
See application file for complete search history.

(56) References Cited

U.S. PATENT DOCUMENTS

| | | | | |
|---|---|---|---|---|
| 9,077,740 | B2 * | 7/2015 | Emmerich | H04L 63/20 |
| 2005/0044224 | A1 * | 2/2005 | Jun | G06Q 20/10 |
| | | | | 709/225 |
| 2005/0060534 | A1 * | 3/2005 | Marvasti | H04L 63/0428 |
| | | | | 713/151 |
| 2009/0217163 | A1 * | 8/2009 | Jaroker | G06F 8/60 |
| | | | | 715/700 |
| 2013/0174246 | A1 * | 7/2013 | Schrecker | H04L 63/029 |
| | | | | 726/14 |
| 2014/0122723 | A1 * | 5/2014 | Glover | G06F 9/5072 |
| | | | | 709/226 |

* cited by examiner

*Primary Examiner* — Izunna Okeke
*Assistant Examiner* — Hee Song
(74) *Attorney, Agent, or Firm* — Schwegman Lundberg & Woessner, P.A.

(57) ABSTRACT

A system and method for establishing secure communication between a first device and a second device, wherein the first device is behind a firewall. A Secure Shell (SSH) connection is established between the first device and the second device, wherein establishing a connection includes establishing a secured communications tunnel from the first device to the second device via an SSH protocol. The first device is registered with the second device, wherein registering includes sending an SSH protocol REGISTER DEVICE message from the first device to the second device. The REGISTER DEVICE message is acknowledged by the second device, wherein acknowledging includes receiving the REGISTER DEVICE message, determining the client applications to register, determining a separate socket port number to be used as a remote port on the second device for each the registered client applications from the list of one or more client applications running on the first device, and transmitting a REGISTER DEVICE ACK message including the remote port number for each registered client application from the second device to the first device. A reverse port forwarding request is made based on the local port number and the remote port number received from in the REGISTER DEVICE ACK message.

12 Claims, 7 Drawing Sheets

| MESSAGE ID | PURPOSE | INCLUDED ATTRIBUTES |
|---|---|---|
| 120 | REGISTER DEVICE | • DEVICE NAME, DESCRIPTION AND SOFTWARE VERSION<br>• CUSTOMER NAME<br>• LIST OF THE CLIENT APPLICATIONS AND THE ASSOCIATED SOCKET PORT NUMBERS FOR EACH APPLICATION (SO-CALLED "LOCAL PORT") |
| 121 | REGISTER DEVICE ACK | • RETURN CODE<br>• SERVER NAME/DESCRIPTION/SOFTWARE VERSION<br>IF TUNNEL REGISTER IS ACCEPTED BY THE SERVER:<br>    • THE SELECTED REMOTE FORWARDING PORT #S ON THE SERVER SIDE FOR THOSE CLIENT APPS (ONE REMOTE FORWARDING PORT PER CLIENT APP)<br>    • APPS PROVIDED BY THE SERVER<br>IF TUNNEL REGISTER IS REJECTED BY THE SERVER:<br>    • REASON FOR REJECTION<br>    • AN OPTIONAL REDIRECT TARGET IF THERE IS ALREADY A TUNNEL BETWEEN THE SAME CLIENT AND SERVER, OR THE SERVER'S CAPACITY IS FULL. |
| 122 | ADD A CLIENT APPLICATION DYNAMICALLY AFTER THE TUNNEL IS ESTABLISHED AND THE DEVICE REGISTRATION IS COMPLETED. | APP NAME AND LOCAL PORT #. |
| 123 | ADD DEVICE APP ACK. | APP NAME AND REMOTE PORT #. |
| 124 | DELETE A CLIENT APPLICATION DYNAMICALLY AFTER THE TUNNEL IS ESTABLISHED AND THE DEVICE REGISTRATION IS COMPLETED. | APP NAME |
| 125 | DELETE DEVICE APP ACK. | APP NAME |

*Fig. 4*

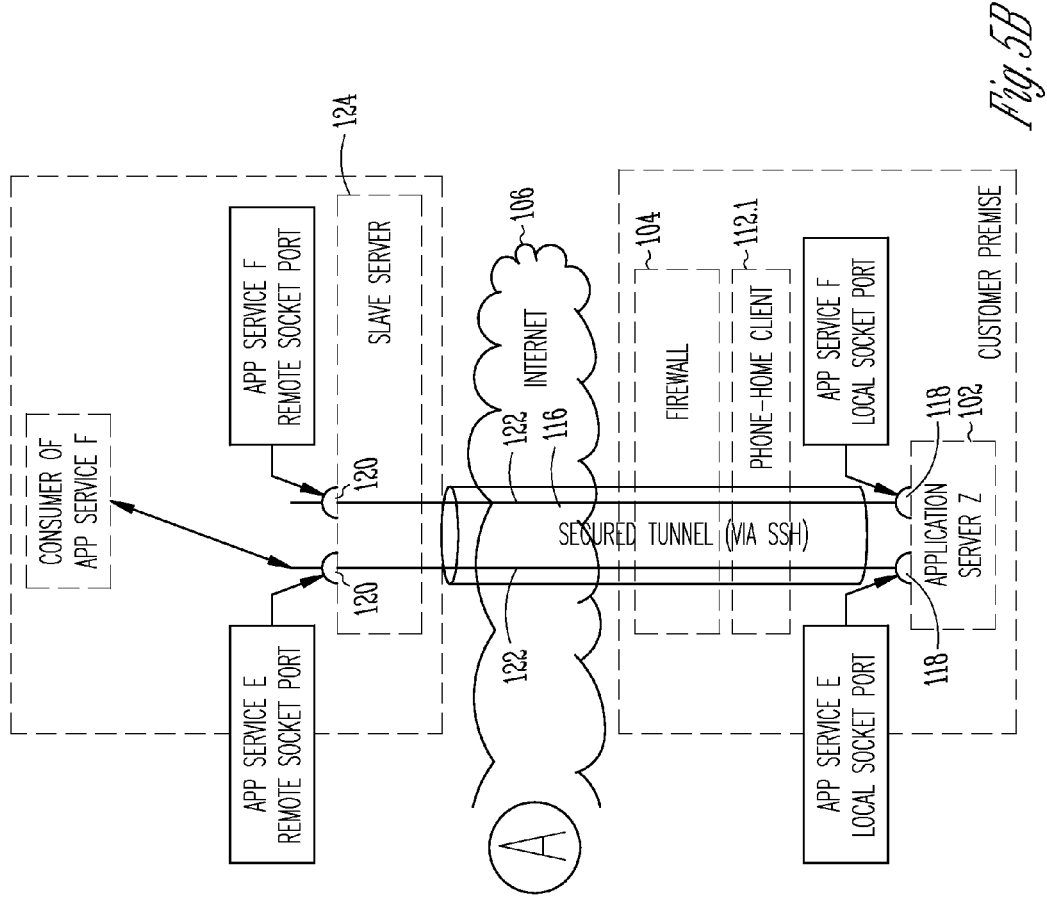

SYSTEM AND METHOD FOR SECURE NETWORK COMMUNICATIONS

BACKGROUND

Communicating with devices that are protected by firewalls or with devices that are protected by Network Address Translation (NAT) is becoming a common scenario for large, geographically-distributed, enterprise software applications.

Current solutions for this common problem include virtual private networks (VPNs) and Secure Shell (SSH) reverse tunneling. Each solution, however, requires some amount of manual configuration, thus limiting network flexibility and scalability.

BRIEF DESCRIPTION OF THE FIGURES

FIG. 4 illustrates a protocol that can be used to establish secure network communications;

FIGS. 5A and 5B illustrate a system for secure network communications; and

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
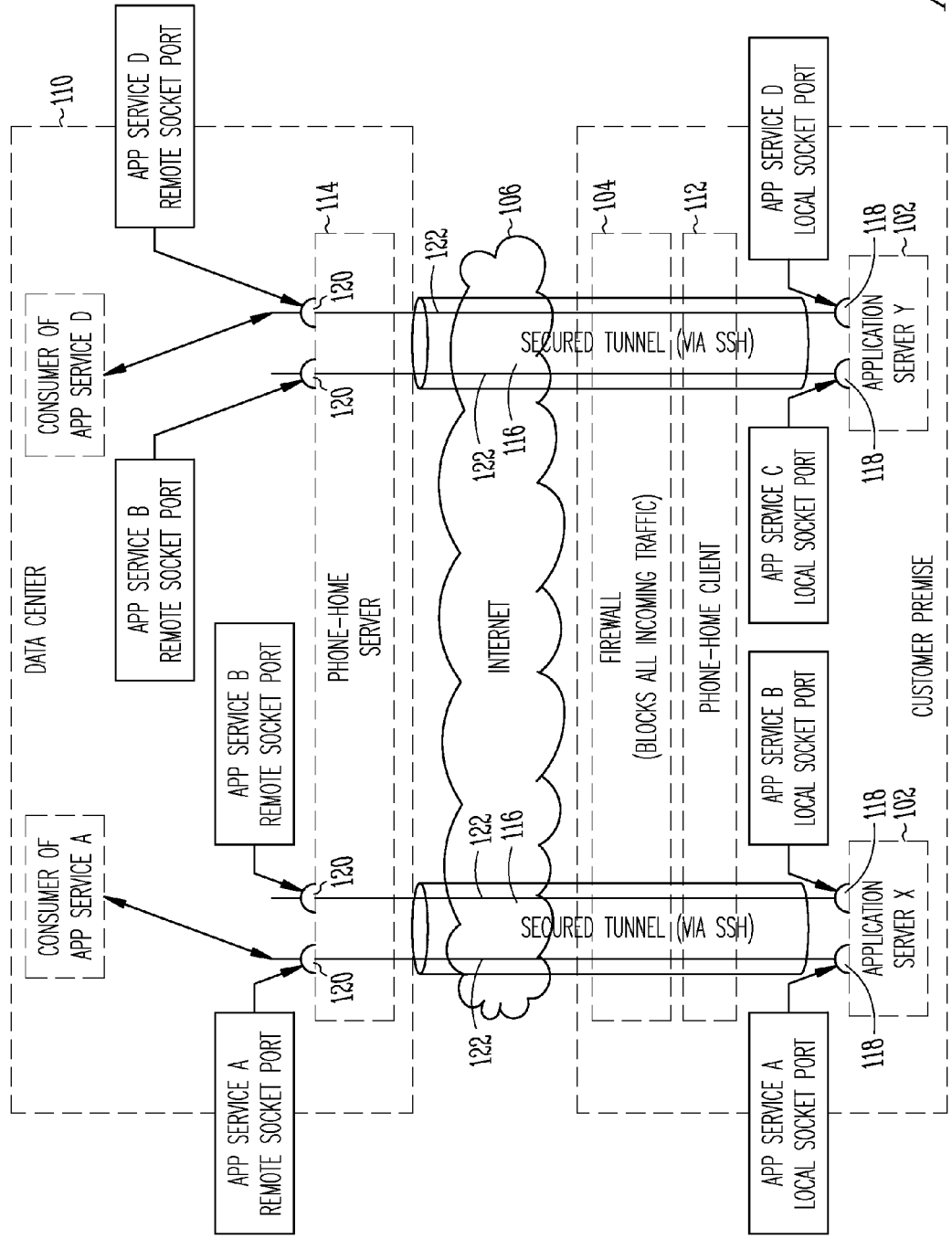
FIG. 1 illustrates a system for secure network communications.

A system 100 for communicating with devices that are protected by firewalls or NATS is shown in FIG. 1. In the example embodiment of FIG. 1, one or more application servers 102 are protected by a firewall 104. Firewall 104 is connected through a network 106 to data center 110. In some embodiments, network 106 is the Internet and data center 110 is implemented in the cloud.

In one example embodiment, a phone-home client 112 is installed within the same private network as application servers 102. A phone-home server 114 is installed in data center 110. Secure tunnels are then established between the phone-home server and the phone-home client as detailed below.

In the example shown in FIG. 1, application servers 102 are protected by firewall 104. Typically, firewall 104 will ensure that TCP socket ports within application servers 102 cannot be accessed from the outside, such as by data center 110. To overcome this, in one embodiment Secure Shell (SSH) protocol is used to set up an SSH reverse tunnel 116 between phone-home server 114 and phone-home client 112.

SSH reverse tunnels are used when you want to connect to a service on a remote machine without opening your firewall or storing SSH private keys on the remote machine. The SSH reverse tunnel approach lets you set up a service on a remote machine while maintaining all of the control on the local machine. In this example, the local machine is phone-home client 112 operating with the customer premises while the remote machine is phone-home server 114 executing on data center 110.

The typical connection requires that you establish an SSH reverse tunnel connection between the local machine and the remote machine using a particular local TCP port (e.g., port xxx) and a particular remote TCP port (e.g., port yyy). If anything connects to port yyy on the remote machine, it is transparently forwarded to port xxx on the local machine. Since the tunnels 116 are initiated by phone-home client 112, firewall 104 will not block the tunnel traffic since firewalls are typically configured to allow outgoing TCP traffic.

After the tunnels are established between Phone-home client 112 and phone-home server 114, the app services' TCP socket ports 118 can be "reverse port forwarded" to the ports 120 of the machine 110 that is running Phone-home server 114, thus allowing accesses to the application service A/B/C/D from within data center 110 via remote socket ports 120. Since "reverse port forwarding" happens on paths 122 within the tunnels 116 (which are totally invisible to firewall 104), firewall 104 will not block the "incoming" traffic. In addition to firewalls, reverse port forwarding can also be used to access a machine behind a gateway or router that is not configurable by the devices outside the gateway or router.

In one example embodiment, system 100 includes a phone-home server 114, a network 106 and one or more phone-home clients 112 connected across the network 106 to the phone-home server 114. Each phone-home client 112 establishes a Secure Shell (SSH) connection with the phone-home server 114, registers one or more applications 102 running on the phone-home client 112 with the phone-home server 114 via a REGISTER DEVICE message, and receives an acknowledgment from the phone-home server 114, wherein the acknowledgment includes a remote port number for each application registered. This register and acknowledgment process establish a local port on client 112 and a remote port on server 114 for each application.

In one embodiment, system 100 includes the ability to auto register/discover client devices (along with all the application services provided by the client devices). To date, systems that use reverse port forwarding to access devices behind a firewall, gateway or router have relied on the manual configuration of the local and remote socket ports. Here, phone-home server 114 selects the remote socket port number from a pool of socket ports.

In one example embodiment, Phone-Home Server 114 manages a large pool of socket ports and selects available ports from a socket port pool. Server 114 then assigns them to different application servers/services dynamically without human intervention. Such an approach is particularly useful in situations where you have large numbers of servers 114 and clients 112, where manual configuration of ports can become burdensome both at initiation and when recovering from system errors or failures.

Figure 2:
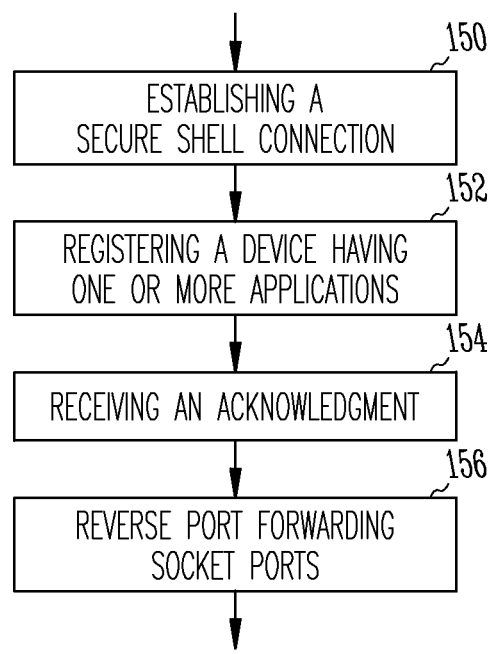
FIG. 2 illustrates a method of establishing a secure network communication.

An example method of establishing reverse port forwarding is shown in FIG. 2. In the example embodiment shown in FIG. 2, reverse port forwarding is used to establish secure communication between a first device and a second device when the first device is behind a firewall. At 150, a Secure Shell (SSH) connection is established between the first device and the second device by establishing a secured communications tunnel from the first device to the second device via an SSH protocol.

At 152, the first device is registered with the second device, wherein registering includes sending an SSH protocol REGISTER DEVICE message from the first device to the second device. In one example embodiment, the REGISTER DEVICE message includes an identifier and a list of one or more client applications, including a first application, running on the first device. In some such embodiments, the list includes a socket port number assigned to each client application; the socket port number serves as a local port for the client application to which the socket port number is assigned.

At 154, the second device acknowledges the REGISTER DEVICE message, determines a socket port number to be used as a remote port on the second device for one or more of the client applications on the list, and forwards the socket port numbers from the second device to the first device.

At 156, the first device transmits a reverse port forwarding request from the first device to the second device. In one such embodiment, the reverse port forwarding request includes the socket port number assigned as local port to the first application and the socket port number determined as remote port for the first application.

In one such embodiment, the second device responds to the reverse port forwarding request with an acknowledgment that includes the local and remote port numbers. An example of registration and acknowledgment is shown in FIG. 3.

Figure 3:
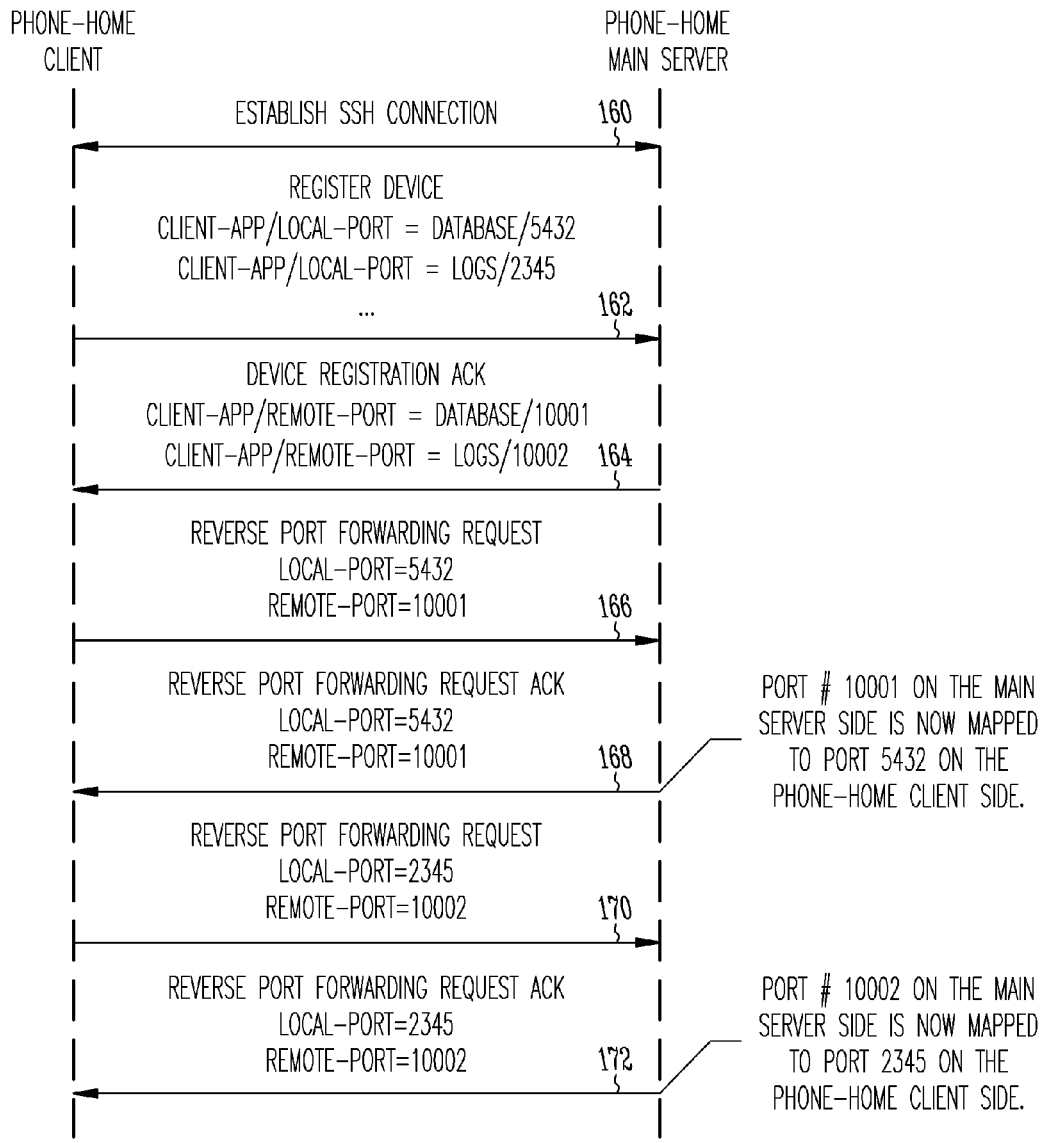
FIG. 3 illustrates another method of establishing a secure network communication.

In the embodiment shown in FIG. 3, at 160, an SSH connection is established between phone-home client 112 and phone-home server 114. At 162, phone-home client 112 sends a REGISTER DEVICE message to phone-home server 114. In the example shown, the REGISTER DEVICE message includes a proposed local port number for two applications executing on client 112.

At 164, phone-home server 114 responds with an acknowledgment. In the example shown, the acknowledgment details a remote port number that server 114 has associated with each of the applications identified by client 112 in 162.

At 166, client 112 makes a reverse port forwarding request for the first application, using the local and remote port numbers determined from 162 and 164. At 168, server 114 responds with a reverse port forwarding request ACK, establishing reverse port forwarding with port #10001 on the server 114 being mapped to port 5432 on the phone-home client side.

At 170, client 112 makes a reverse port forwarding request for the second application, using the local and remote port numbers determined from 162 and 164. At 172, server 114 responds with a reverse port forwarding request ACK, establishing reverse port forwarding with port #10002 on the server 114 being mapped to port 2345 on the phone-home client side.

In the above example, the Phone-Home client 112 provides two application services (database and logs) at two different local port numbers (5432 and 2345) and, after the handshake, the two application services become accessible at port numbers 10001 and 10002 at server 114.

In one embodiment, the standard SSH-2.0 protocol is extended to support automatic registration of client devices and application services. One such embodiment is shown in FIG. 4.

The SSH protocol defines many messages and the message IDs are in the range 1-100. In one example embodiment, tunnel control messages according to the present approach will use ID 120-125 as shown in FIG. 4. The payload of all the messages will be plain ASCII text strings with attributes separated by new line chars ("\n"). The attributes are in the format of <attribute name>=<value> and separated by new line char ("\n").

In the example embodiment of FIG. 4, message ID 120 is used for the REGISTER DEVICE message. In one example embodiment, the REGISTER DEVICE message includes an identifier, a list of client applications and the associated socket port numbers for each application (so-called "local ports"). In one such embodiment, the identifier is a device name. In other embodiments, the identifier is selected from one or more of a device name, a device description, a software revision relevant to the device, and a customer identifier.

In the example embodiment shown in FIG. 4, message ID 121 is used for the REGISTER DEVICE ACK message. In one example embodiment, the REGISTER DEVICE ACK message includes an identifier, a list of client applications that have been registered by server 114 and the associated socket port numbers for each registered application (so-called "remote ports"). In one such embodiment, the identifier is a server name. In other embodiments, the identifier is selected from one or more of a server name, a server description, and a software revision relevant to the server.

In some embodiments, message ID 121 returns a reason for rejection for each application rejected by server 114. In some such embodiments, the reason for rejection includes a redirect target. In some embodiments, however, no reason is given for a redirect; in such embodiments, message ID 121 includes the redirect identifier, but no reason for rejection.

Once reverse port forwarding has been established between a client 112 and a server 114 for one of the applications on client 112, in some embodiments other applications can be added dynamically. In the example shown in FIG. 4, message ID 122 is used to add a client application dynamically after the tunnel is established and the device registration is completed. In some embodiments, message ID 122 includes a list of client applications and the associated socket port numbers for each application. Message ID 123 provides the acknowledgment, and the remote port number.

In some embodiments, individual applications can be removed. In the example embodiment shown in FIG. 4, message ID 124 is used to delete a client application dynamically after the tunnel is established and the device registration is completed. In the example embodiment shown in FIG. 4, message ID 124 includes the application name. Message ID 125 provides the acknowledgment.

The protocol described in FIGS. 2-4 can be used to enhance reliability in system 100 and to load balance between servers in a distributed phone-home server. In one high availability application, a backup server 120 runs in tandem to phone-home server 114. In one load balancing application, a server 120 receives device registrations from devices that were redirected when they attempted to register with server 114.

Figure 5A:
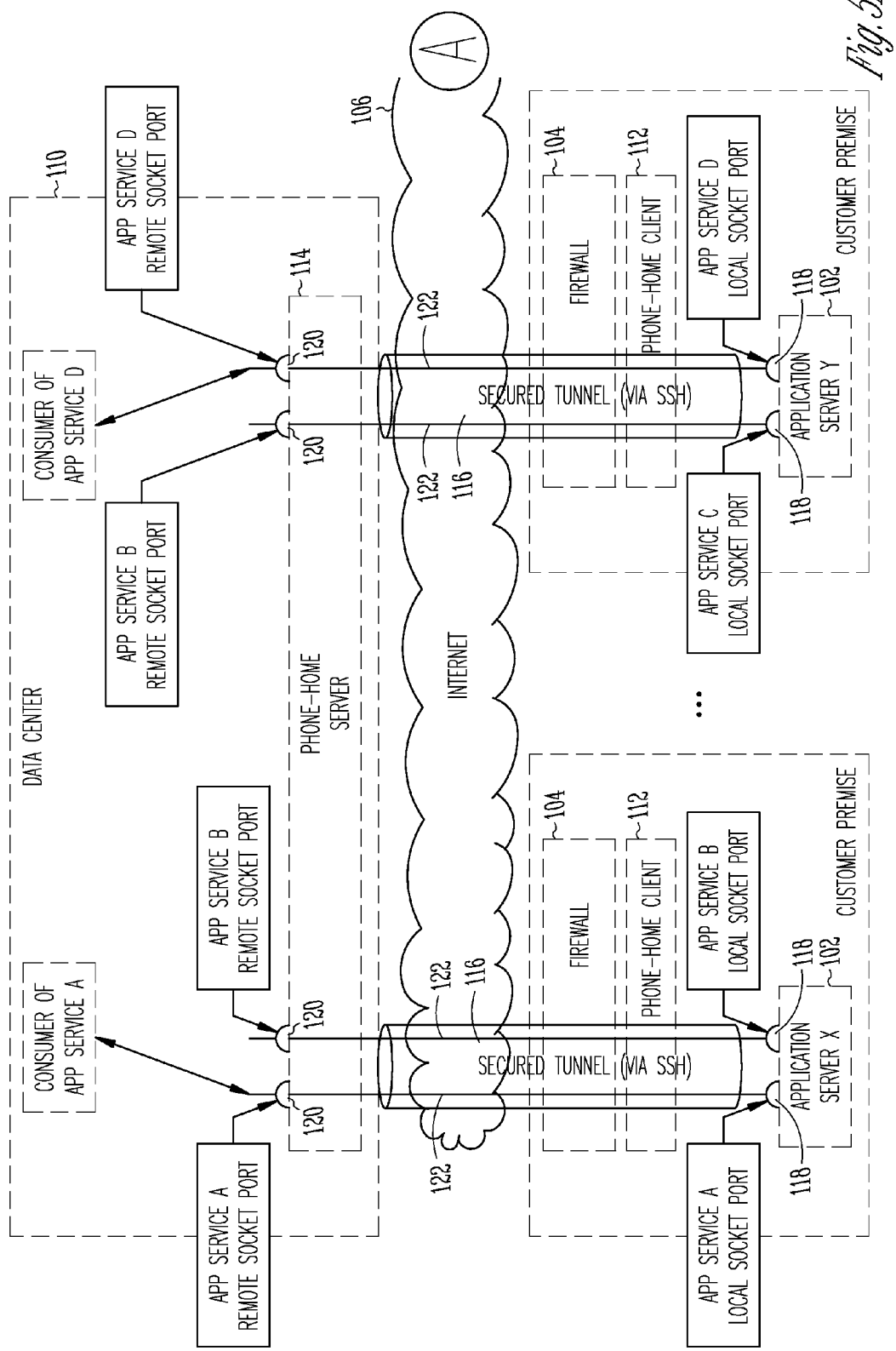

An example secure communications system 400 is shown in FIGS. 5A and 5B. In the example secure communications system of FIGS. 5A and 5B, a phone-home server 114 and a slave server 124 are connected across a network 106 to one or more phone-home clients 112. In one embodiment, each phone-home client 112 establishes a Secure Shell (SSH) connection with the phone-home server 114 and registers one or more applications running on the phone-home client 112 with the phone-home server 114 via a REGISTER DEVICE message. (The Secure Shell (SSH) connection between phone-home server 114 and phone-home client 112.1 in FIG. 5B is present but not shown.) The phone-home server 114 receives the REGISTER DEVICE message from one or more of the phone-home clients 112, rejects the attempt to register (from, in this case, phone-home client 112.1) and redirects the phone-home client 112 to slave server 124. In the example shown in FIG. 5B, Phone-home client 112.1 receives the REGISTER DEVICE Acknowledge rejecting its attempt to register applications on Application Server Z and redirecting it to slave server 124. Phone-home client 122 then makes a Secure Shell (SSH)) connection with slave server 124 and registers one or more applications on Application Server Z with slave server 124 via the REGISTER DEVICE message.

This occurs, for example, when phone-home server 114 is too busy, when slave server 124 is not busy enough, or for enhanced system reliability.

In embodiments such as are shown in FIGS. 5A and 5B, each redirected phone-home client 112 establishes a Secure Shell (SSH) connection with slave server 124, registers one or more applications running on the phone-home client 112 with the slave server 124 via a REGISTER DEVICE message, and receives an acknowledgment from the slave server 124, wherein the acknowledgment includes a remote port number for each application registered.

Figure 6:
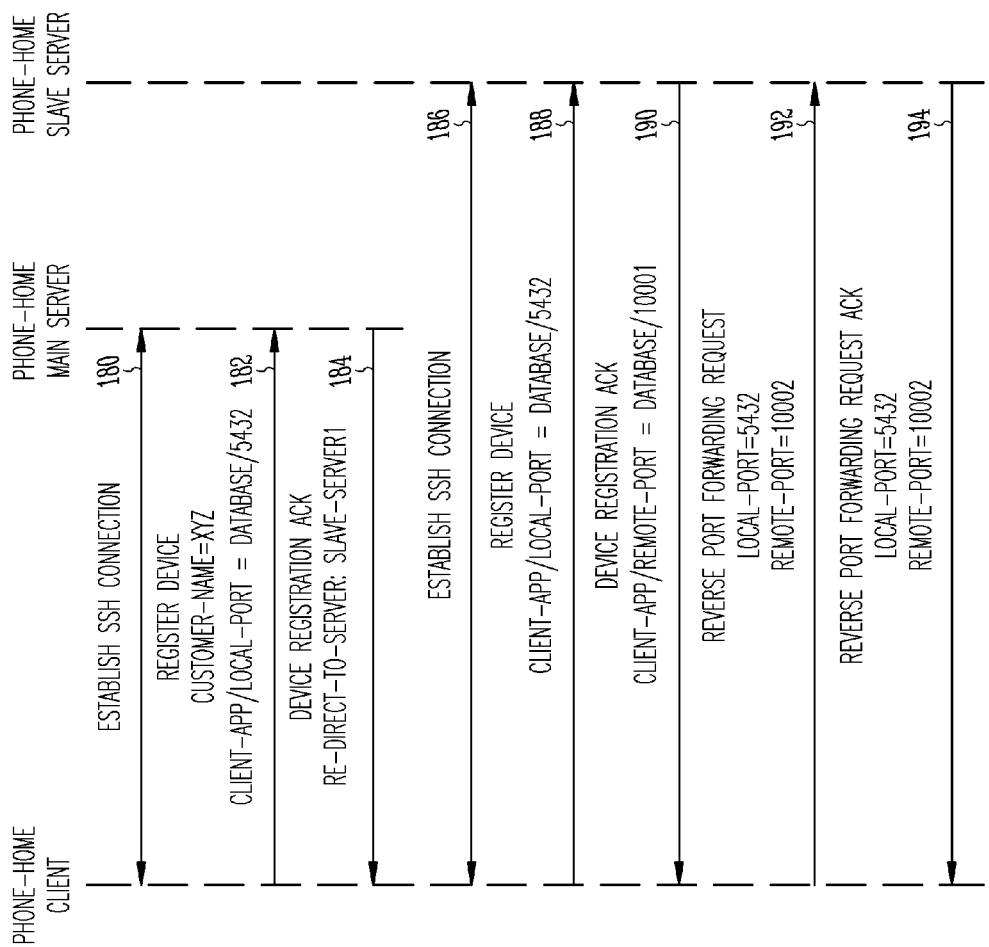
FIG. 6 illustrates a method of establishing a secure network communication with redirection.

An example embodiment of redirection is shown in FIG. 6. In the example of FIG. 6, at 180 an SSH connection is established between phone-home client 112 and phone-home server 114. At 182, phone-home client 112 sends a REGISTER DEVICE message to phone-home server 114. In the example shown, the REGISTER DEVICE message includes a customer name and a proposed local port number for an application executing on client 112.

At 184, phone-home server 114 responds with an acknowledgment that rejects the registration of application "database". In the example shown, the acknowledgment provides a redirect target (slave-server 1), but no reason for the rejection.

At 186, client 112 established an SSH connection between phone-home client 112 and phone-home server 114. At 188, phone-home client 112 sends a REGISTER DEVICE message to phone-home server 114. In the example shown, the REGISTER DEVICE message includes a proposed local port number for an application executing on client 112.

At 190, phone-home server 114 responds with an acknowledgment. In the example shown, the acknowledgment details a remote port number that server 114 has associated with the application identified by client 112 in 188.

At 192, client 112 makes a reverse port forwarding request for the first application, using the local and remote port numbers determined from 188 and 190. At 194, server 114 responds with a reverse port forwarding request ACK, establishing reverse port forwarding with port #10001 on the server 114 being mapped to port 5432 on the phone-home client side.

The example embodiment shown in FIG. 6 can be used to balance the load among multiple Phone-Home server instances (main servers 114 and slave servers 124). In one example embodiment, Phone-Home Main Server 114 owns the public domain name that is well known to all the Phone-Home clients, while the slave Phone-Home Slave Server(s) 124 may not have a public domain name.

What has been discussed above is the use of reverse port forwarding to establish secure communication between a first device and a second device when the first device is behind a firewall, a gateway or a router. The systems and methods described above simplify system operation by providing the ability to register devices and applications for use of applications across a network or in the cloud. The approach can be used to load balance servers and to make them more reliable.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A method of establishing secure communication between a first device and a second device, wherein the first device is behind a firewall, comprising:
    establishing a Secure Shell (SSH) connection between the first device and the second device, wherein establishing a connection includes establishing a secured communications tunnel from the first device to the second device via an SSH protocol;
    registering the first device with the second device, wherein registering includes sending an SSH protocol REGISTER DEVICE message from the first device to the second device, wherein the REGISTER DEVICE message includes an identifier and a list of one or more client applications running on the first device, wherein the list includes a socket port number assigned to each client application, wherein the socket port number serves as a local port for the client application to which the socket port number is assigned;
    acknowledging the REGISTER DEVICE message at the second device, wherein acknowledging includes receiving the REGISTER DEVICE message, determining the client applications to register, determining a separate socket port number to be used as a remote port on the second device for each the registered client applications from the list of one or more client applications running on the first device, and transmitting a REGISTER DEVICE ACK message including a remote port number of the remote port for each registered client application from the second device to the first device, wherein determining a separate socket port includes selecting the socket port to be used as the remote port from a pool of available socket ports;
    transmitting a reverse port forwarding request from the first device to the second device, wherein the list of applications includes a first application and wherein the reverse port forwarding request includes the socket port number assigned as local port to the first application and the socket port number determined as the remote port for the first application; and
    receiving, from the second device, a reverse port forwarding request acknowledgment associated with the first application.

2. The method of claim 1, wherein the identifier is selected from one or more of a device name, a device description, a software revision and a customer identifier.

3. The method of claim 1, wherein transmitting a REGISTER DEVICE ACK message includes transmitting a list of registered applications and the remote port numbers assigned to each registered application.

4. The method of claim 1, wherein transmitting a REGISTER DEVICE ACK message includes transmitting a list of rejected applications.

5. The method of claim 1, wherein transmitting a REGISTER DEVICE ACK message includes transmitting a list of rejected applications and a redirect target.

6. A method of establishing secure communication between a client device behind a firewall and one of a plurality of servers, the method comprising:
- establishing a Secure Shell (SSH) connection between the client device and a first server of the plurality of servers, wherein establishing a connection includes establishing a secured communications tunnel from the client device to the first server via an SSH protocol;
- registering the client device with the first server, wherein registering includes sending an SSH protocol REGISTER DEVICE message from the client device to the first server, wherein the REGISTER DEVICE message includes an identifier and a list of one or more client applications running on the client device, wherein the list includes a socket port number assigned to each client application, wherein the socket port number serves as a local port for the client application to which the socket port number is assigned;
- acknowledging the REGISTER DEVICE message at the first server, wherein acknowledging receiving the REGISTER DEVICE message, determining the client applications to register, determining a separate socket port number to be used as a remote port on the first server for each registered client applications from the list of one or more client applications running on the first device, and transmitting a REGISTER DEVICE ACK message including a remote port number of the remote port for each registered client application from the first server to the client device, wherein acknowledging includes determining the applications to reject and transmitting a REGISTER DEVICE ACK message includes identifiers for each client application rejected from the list of one or more client applications running on the client device;
- transmitting a reverse port forwarding request from the client device to the first server, wherein the list of applications includes a first application and wherein the reverse port forwarding request includes the socket port number assigned as local port to the first application and the socket port number determined as the remote port for the first application; and
- receiving, from the first server, a reverse port forwarding request acknowledgment associated with the first application.

7. The method of claim 6, wherein the identifier includes a customer name.

8. The method of claim 6, wherein the REGISTER DEVICE ACK message includes a redirect target for at least one of the rejected client applications.

9. The method of claim 6, wherein the REGISTER DEVICE ACK message includes a redirect target for each rejected client application.

10. The method of claim 9, wherein acknowledging further includes selecting the redirect target as part of a load balancing process.

11. A secure communications system, comprising:
- a phone-home server;
- a slave server;
- a network; and
- one or more phone-home clients connected across the network to the phone-home server and the slave server, wherein each phone-home client establishes a Secure Shell (SSH) connection with the phone-home server and registers one or more applications running on the phone-home client with the phone-home server via an SSH protocol REGISTER DEVICE message;
- wherein the phone-home server receives the REGISTER DEVICE message from one or more of the phone-home clients, rejects one or more applications presented by the REGISTER DEVICE message and redirects the rejected applications to the slave server;
- wherein each redirected phone-home client establishes a Secure Shell (SSH) connection with the slave server, registers one or more applications running on the phone-home client with the slave server via a REGISTER DEVICE message, and receives an acknowledgment from the slave server, wherein the acknowledgment includes a remote port number of a remote port for each application registered, wherein the remote port is a socket port selected from a pool of available socket ports,
- wherein each phone-home client creates a reverse port forwarding tunnel as a function of the remote port assigned to each registered application and of a local port on the phone-home client associated with the registered application.

12. The secure communications system of claim 11, wherein the phone-home server includes a plurality of computing devices and a load balancing mechanism for allocating tunnels across the plurality of computing devices.

* * * * *